(12) United States Patent
Glew

(10) Patent No.: US 6,935,283 B2
(45) Date of Patent: Aug. 30, 2005

(54) FUEL SUPPLY SYSTEM FOR AN INTERNAL COMBUSTION ENGINE

(76) Inventor: Wayne Kenneth Glew, 856 Chapman Road, Geraldton West Australia (AU), 6532

( * ) Notice: Subject to any disclaimer, the term of this patent is extended or adjusted under 35 U.S.C. 154(b) by 128 days.

(21) Appl. No.: 10/336,613

(22) Filed: Jan. 3, 2003

(65) Prior Publication Data

US 2003/0154933 A1 Aug. 21, 2003

(30) Foreign Application Priority Data

Jan. 4, 2002 (AU) ............................................. PR9832

(51) Int. Cl.[7] ............................................. F02M 23/14
(52) U.S. Cl. ......................................... 123/3; 123/555
(58) Field of Search ............................ 123/3, 555, 556

(56) References Cited

U.S. PATENT DOCUMENTS

| | | | | |
|---|---|---|---|---|
| 3,992,165 A | * | 11/1976 | Newkirk ................... 48/214 R |
| 4,572,146 A | | 2/1986 | Grünwald et al. |
| 4,735,186 A | * | 4/1988 | Parsons ........................ 123/3 |
| 5,515,814 A | * | 5/1996 | Cooke ........................... 123/3 |
| 5,666,929 A | | 9/1997 | Knowlton et al. |
| 5,785,136 A | * | 7/1998 | Falkenmayer et al. ..... 180/65.2 |
| 5,976,723 A | * | 11/1999 | Boffito et al. .................. 429/17 |
| 6,155,212 A | * | 12/2000 | McAlister ....................... 123/3 |
| 6,209,494 B1 | * | 4/2001 | Manikowski et al. .......... 123/3 |
| 6,314,919 B1 | * | 11/2001 | Pugachev ....................... 123/3 |

FOREIGN PATENT DOCUMENTS

| | | |
|---|---|---|
| DE | 3138415 | 5/1983 |
| GB | 2 305 215 | 4/1997 |
| JP | 10-115269 | 5/1998 |
| WO | 95/29335 | 11/1995 |

* cited by examiner

Primary Examiner—Henry C. Yuen
Assistant Examiner—Jason Benton
(74) Attorney, Agent, or Firm—Burr & Brown

(57) ABSTRACT

A fuel supply system 10 for an internal combustion engine includes a housing 12 defining a chamber 14 and provided with an inlet opening 16 upstream of the chamber 14 and an outlet opening 18 downstream of the chamber 14. The fuel injector 20 sprays a fuel mist into the chamber 14. A heater 22 heats air flowing into the chamber 14 via inlet 16 to a temperature of between 110° C.–260° C. Pressure within the chamber 14 is also negative relative to ambient pressure. The fuel sprayed into the chamber 14 via the fuel injector 20 is thermally cracked so that a mixture of thermally cracked fuel and heated air flows out from the outlet 18 for combustion in combustion chambers of the engine.

48 Claims, 2 Drawing Sheets

FUEL SUPPLY SYSTEM FOR AN INTERNAL COMBUSTION ENGINE

FIELD OF THE INVENTION

The present invention relates to a fuel supply system for an internal combustion engine.

BACKGROUND OF THE INVENTION

The present Applicant has previously invented a fuel supply system described in International Application No. PCT/AU95/00239. This system includes a vaporisation chamber in which is provided a foam mantle for suspending fuel in a flow of air from a venturi inlet for vaporising the fuel. The vaporised fuel is mixed with the air in a mixing chamber and then conveyed to an intake manifold of an internal combustion engine. Fuel is supplied to a lower portion of the mantle via a fuel pump with any excess fuel returned via a scavenging system to a fuel supply. Embodiments of the prior fuel supply system have provided marked increases in fuel efficiency where the fuel consumption in a six cylinder vehicle motor has reduced from around 13 liters per 100 kms to approximately 2.6 liters per 100 kms.

Starting with this system as a base, the Applicant has made various modifications leading to a further fuel supply system which operates on different principles, is mechanically simpler, and potentially provides greater fuel efficiency.

SUMMARY OF THE INVENTION

Throughout this specification and claims the term "thermal cracking" in relation to fuel is used to mean vaporisation, volatilisation, or decomposition of high molecular weight hydrocarbons to lower molecular weight hydrocarbons, or any combination thereof.

According to the present invention there is provided a fuel supply system for an internal combustion (IC) engine, said system comprising:

a housing defining a thermal cracking chamber, and provided with an air inlet opening upstream of said chamber and an outlet opening downstream of said chamber;

a fuel injector that injects a fuel mist into said chamber;

an air heater that heats air flowing through said inlet opening into said chamber a temperature in the range of 110°–260° C.;

a controller coupled with said fuel injector to control the injection of said fuel mist into said chamber; and, an air temperature sensor for providing a first signal to said controller indicative of the temperature of air flowing into said chamber through said inlet opening, and wherein said controller is programmed to vary the volume of fuel in said fuel mist inversely with variations in said air temperature;

whereby, in use, said fuel is thermally cracked in said chamber by collision with molecules of said heated air to form a thermally cracked fuel and heated air mixture, which is supplied to a fuel intake manifold of said IC engine via said outlet opening.

According to the invention there is also provided a fuel supply system for an internal combustion engine comprising: a chamber having first and second opposite end walls and a side wall extending between said opposite end walls with an inlet opening formed in said first wall and an outlet opening formed in said second wall;

a fuel injector for injecting a fuel mist into said chamber;

an air heater for heating air to a temperature of between 110° C. to 260° C.;

a conduit for directing said heated air into said chamber through said air inlet;

a controller coupled with said fuel injector to control the injection of said fuel mist into said chamber; and, an air temperature sensor for providing a first signal to said controller indicative of the temperature of air flowing into said chamber through said inlet opening, and wherein said controller is programmed to vary the volume of fuel in said fuel mist inversely with variations in said air temperature;

said fuel mist mixing with said heated air in said chamber to cause thermal cracking of said fuel and form a thermally cracked fuel and heated air mixture, said mixture being drawn from said outlet for combustion in a combustion chamber of said internal combustion engine.

Preferably said inlet opening is of a diameter less than a diameter of said chamber whereby pressure of said heated air is reduced upon flowing through said inlet opening into said chamber.

Preferably said outlet opening is of a diameter less than said inlet opening.

Preferably said chamber is of a diameter at least two and a half times the diameter of said outlet opening.

Preferably said inlet opening and outlet opening are separated by a distance of at least 20 cm.

Preferably said inlet opening is of a diameter of approximately 60 mm.

Preferably said outlet opening has a diameter of approximately 42 mm.

Preferably said fuel injector sprays fuel into said chamber from said first wall.

Preferably said fuel injector includes one or more orifices are arranged about said inlet opening.

Preferably said inlet opening is formed with an downstream portion of progressively increasing diameter.

Preferably said system further includes an oxygen sensor disposed in an exhaust manifold of said IC engine and providing a second signal to said controller indicative of the oxygen content of exhaust gases produced by combustion of said cracked fuel in said IC engine, and wherein said controller is programmed to vary the volume of fuel in said fuel mist inversely with variations in said oxygen content.

Preferably said system further includes a valve provided in said outlet and adapted for coupling to an accelerator control of a vehicle in which said IC engine is mounted, said valve having a minimum open position providing maximum restriction to flow of said cracked fuel to said fuel intake manifold, and a maximum open position providing minimum restriction to flow of said cracked fuel to said fuel intake manifold, and a valve position sensor providing a third signal to said controller indicative of the degree of openness of said valve, and wherein said controller is programmed to vary the volume of fuel in said mist in proportion to the degree of openness of said valve.

Preferably said system further includes a cold start fuel injector for spraying a fuel mist into a conduit coupled to said outlet on initial operation of said internal combustion engine.

Preferably said controller is further operatively coupled to said cold start fuel injector for controlling the volume of fuel in the fuel mist spray by said cold start injector on the basis of said air temperature such that said controller disables said cold start fuel injector when said air temperature is above a threshold temperature.

Preferably said housing is in the form of a cylindrical canister having first and second opposite axial ends wherein said air intake and said fuel injection means supply air and said fuel mist respectively from said first axial end; and wherein said outlet is provided at said second axial end.

According to the invention there is provided a method of conditioning liquid fuel prior to combustion in an internal combustion engine, said method comprising:

providing a chamber with an inlet opening at one end and an outlet opening at an opposite end;

injecting a mist of liquid fuel into said chamber;

introducing heated fresh air at a temperature of between 110° C. to 260° C. into said chamber via said inlet opening;

mixing said fuel with said heated air to thermally crack said liquid fuel and form a thermally cracked fuel and heated air mixture;

and drawing said mixture from said outlet for combustion in said internal combustion engine.

According to the invention there is provided a fuel system for an internal combustion (IC) engine, said system comprising:

a housing defining a thermal cracking chamber, and provided with an air inlet opening upstream of said chamber and an outlet opening downstream of said chamber;

a fuel injector for injecting a fuel mist into said chamber; and, an air heater that heats fresh air prior to flowing through said inlet opening into said chamber to a temperature in the range of 110°–260° C.;

said fuel being thermally cracked in said chamber by collision with molecules of said heated air to form a thermally cracked fuel and heated air mixture, which is supplied to a fuel intake manifold of said IC engine via said outlet opening.

According to the invention there is provided a fuel system for an internal combustion engine comprising:

a chamber having first and second opposite end walls and a side wall extending between said opposite end walls, with an inlet opening formed in said first wall and an outlet opening formed in said second wall;

a fuel injector for injecting a fuel mist into said chamber;

an air heater for heating fresh air prior to said fresh air flowing into said chamber through said inlet opening;

a conduit for directing said heated air into said chamber through said air inlet;

said inlet opening, chamber and outlet opening relatively dimensioned to cause a reduction in pressure of said heated air when it flows into said chamber; said fuel mist mixing with said heated air in said chamber to cause thermal cracking of said fuel and form a thermally cracked fuel and heated air mixture, said mixture being drawn from said outlet for combustion in a combustion chamber of said internal combustion engine.

According to the invention there is provided a method of conditioning liquid fuel prior to combustion in an internal combustion engine, said method comprising:

providing a chamber with an inlet opening at one end and an outlet opening at an opposite end;

injecting a mist of liquid fuel into said chamber;

introducing fresh heated air into said chamber via said inlet opening;

reducing pressure of said heated air upon entry into said chamber;

mixing said fuel with said heated air to thermally crack said liquid fuel and form a thermally cracked fuel and heated air mixture; and, drawing said mixture from said outlet for combustion in said internal combustion engine.

BRIEF DESCRIPTION OF THE DRAWINGS

An embodiment of the present invention will now be described in detail with reference to the accompanying drawings in which.

DETAILED DESCRIPTION OF THE PREFERRED EMBODIMENTS

Figure 1:
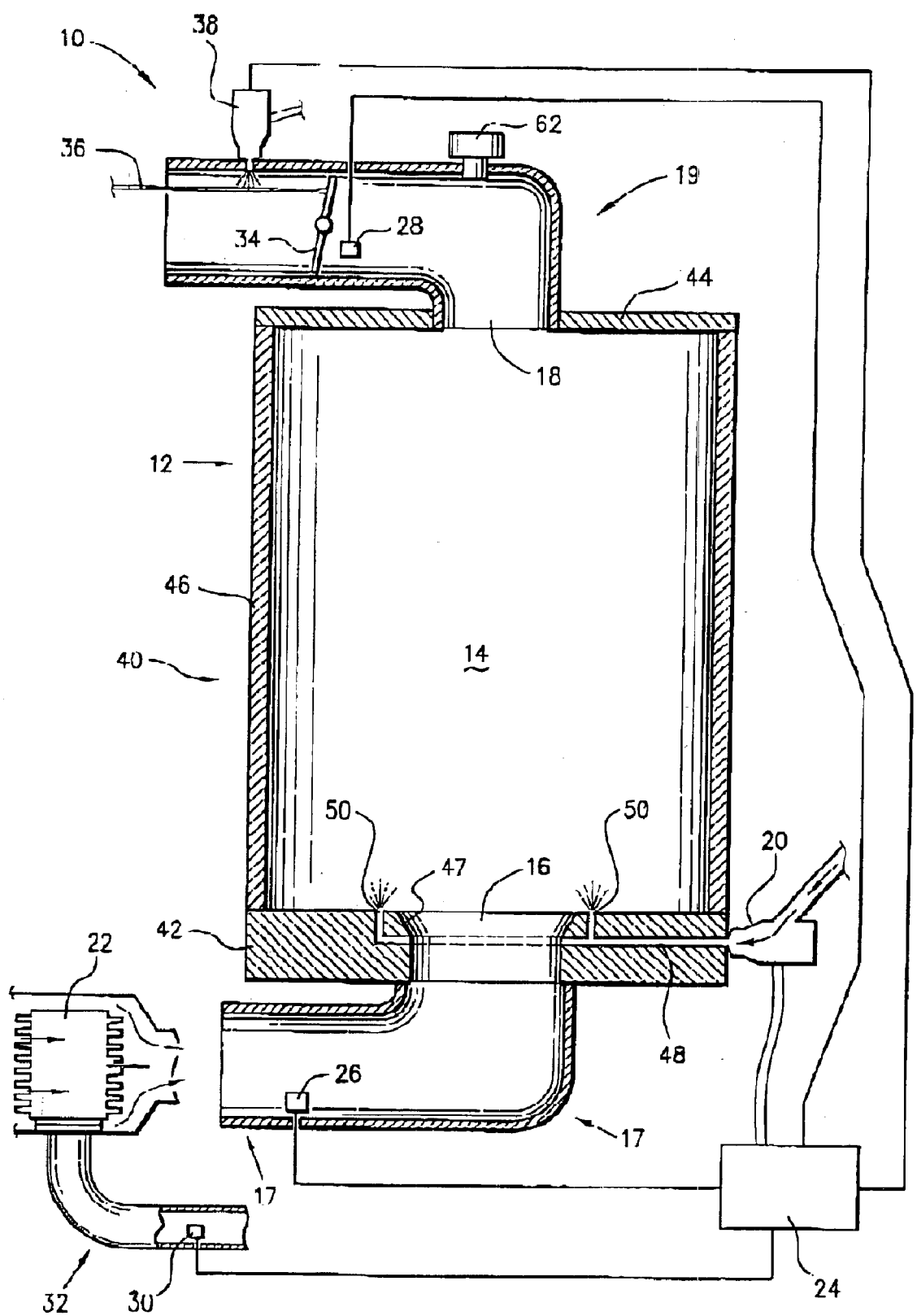
FIG. 1 is a schematic representation of a first embodiment of a fuel supply system in accordance with the present invention; and, FIG. 2 is a schematic representation of a second embodiment of the fuel supply system.

Referring to FIG. 1, a fuel supply system 10 for an internal combustion engine (not shown) includes a housing 12 defining a chamber 14 and provided with an air inlet opening 16 upstream of the chamber 14 and an outlet opening 18 downstream of the chamber 14. Fuel injector means in the form of a fuel injector 20 is provided in the system to spray a fuel mist into the chamber 14. The system 10 further includes a heater 22 for heating air flowing via a conduit 17 into the chamber 14 via inlet opening 16 to produce heated air having a temperature in the range of 110°–260° C. The fuel sprayed into the chamber 14 via the fuel injector 20 is thermally cracked by collision with molecules of the heated air to form a thermally cracked fuel and heated air mixture which is supplied to a fuel intake manifold (not shown) of the engine via the outlet 18 for combustion in combustion chambers (not shown) of the engine.

There is naturally a temperature gradient between the inlet 16 and the outlet 18 with air temperature being lower at the outlet 18 due to the mixing of fuel (which is initially at a lower temperature) with the air and the absorption of heat in thermally cracking the fuel. Substantially all of the fuel sprayed into the chamber 14 is thermally cracked by the time it passes out through the outlet 18.

A controller 24 is coupled with the fuel injector 20 to control the injection of the fuel mist into the chamber 14. In this regard, the controller 24 receives inputs from an air temperature sensor 26 disposed in the conduit 17, a throttle valve position sensor 28 disposed in a conduit 19 in communication with the outlet 18, and an oxygen sensor 30 disposed in an exhaust manifold 32 of the engine.

The air temperature sensor 26 provides a signal to the controller 24 indicative of the air temperature of the heated air passing through the inlet opening 16 into the chamber 14. The controller 24 is programmed to vary the volume of fuel in the fuel mist sprayed by the injector 20 inversely with changes in sensed air temperature. Thus as the temperature increases, the control 24 acts to decrease the volume of fuel sprayed into the chamber 14.

Similarly, the controller receives a signal from the oxygen sensor 30 indicative of the amount of oxygen in the exhaust gases of the engine to which the fuel system 10 supplies fuel. The controller 24 again varies the volume of fuel sprayed by the injector 20 into the chamber 14 inversely with changes in the sensed oxygen content or level in the exhaust gases.

The thermally cracked fuel and heated air mixture passes from the outlet 18 through conduit 19 as a vapour to a fuel intake manifold of the engine. Disposed within the conduit 19 is a throttle (butterfly) valve 34. This valve is linked to an accelerator control of the vehicle such as an accelerator pedal via a link or cable 36. Valve 34 has a minimum open position (as shown in FIG. 1) where it provides maximum flow restriction of the cracked fuel through the outlet 18 to the fuel intake manifold. This position may be equated with an idle condition of the engine. Valve 34 also has a maximum open position in which it lies in a substantially horizontal plane providing minimum restriction to the flow of thermally cracked fuel through the outlet 18 to the fuel intake manifold. The valve position sensor 28 senses the position of the valve 34 to provide a signal to the controller 24 indicative of the degree of openness of the valve 34. The controller 24 is programmed to vary the volume of fuel in the fuel mist injected by the injector 20 in proportion to the sensed degree of openness of the valve 34. Thus, when the valve 34 is in its minimum open position, the controller 24 controls the injector 24 to spray a smaller volume of fuel into the chamber 14 than when the valve 34 is sensed as being in the maximum open position.

The heater 22 is typically in the form of a heat sink in thermal contact with the exhaust manifold 32. The air intake 16 is arranged to draw heat from over or through the heat sink 22.

It will be appreciated that during initial start-up there will be a delay in the heating of the air drawn into the chamber 14 through the inlet 16 to effect thermal cracking of the fuel. To assist in the smooth operation of the engine during this period a cold start-up injector 38 is provided which is coupled to the conduit 19 for spraying a fuel mist directly into the air passing through the outlet 1 8 on its way to the fuel intake manifold. Cold start injector 38 is also under the control of the controller 24 and is shut off by the controller 24 when the temperature of the air passing through the air intake 16 as sensed by the sensor 26 which has a threshold level, for example 110° C.

Further, if the engine to which the system 10 is fitted has been running for a period of time, is then turned OFF and restarted shortly thereafter so that residual heat remains within the engine, the air temperature within the intake 16 may at the start-up already be at the threshold level or at least may take less time than during a cold start condition to reach the threshold level. Accordingly the cold start injector 38 will be operated for a shorter period of time.

The thermal cracking of the fuel within the chamber 14 is believed to involve one or more of (a) a non catalytic cracking process decomposing the fuel into molecules of lower molecular weight, (b) vaporisation and (c) volatilisation. In a series of tests, it has been found that use of an embodiment of this invention has led to improvements in fuel consumption of a 6 cylinder engine from a standard fuel consumption of 17 miles per gallon to 60 miles per gallon.

During the operation of the system 10 the chamber 14 is under a negative pressure relative to the pressure within the conduit 19. This is caused by the increase in diameter of the chamber 14 relative to the diameter of the inlet opening 16. It is further believed that the creation of the negative pressure within the chamber 14 assists in the cracking occurring in the chamber.

The cracking of the fuel may also be enhanced by the addition of an appropriate catalyst.

The chamber 12 is in the form of a cylindrical canister 40 having first and second opposite end walls 42 and 44 respectively, and a cylindrical side wall 46 extending therebetween. The end wall 42 forms a base of the canister 40 and is provided with the inlet opening 16, which may be considered as a venturi, for directing the heated air into the chamber 14. The end wall 42 is also formed with a channel 48 and a plurality of risers 50 which form part of the fuel injector 20 for spraying a fuel mist into the chamber 14. Each of the risers 50 opens as an orifice onto a surface of the wall 42 inside of the chamber 14 and are arranged about the inlet opening 16. The diameter of the orifices of the risers 50 may be formed of a diameter sufficient to cause the fuel to emanate therefrom as a mist. Alternately, spray nozzles (not shown) may be coupled with or provided at the end of the risers 50 to provide a fine mist of the fuel.

The outlet opening 18 may be formed with a diameter less than that of the inlet opening 16. Also, the diameter of the chamber 14 is preferably at least two and a half times the diameter of the outlet opening 18. As an example, the inlet opening 16 may have a diameter, at the inside surface of wall 42, of approximately 60 mm, with the outlet opening 18 having a diameter in the order of 42 mm. The distance between the walls 42 and 44, ie the axial length of the chamber 40 should be at least 20 cm. The inlet opening 16 is also formed with a downstream section 47 of progressively increasing diameter. In tests conducted on an embodiment of the present invention, the pressure drop provided within the chamber 14 was approximately 6 lb at an engine speed of 1000 rpm.

Figure 2:
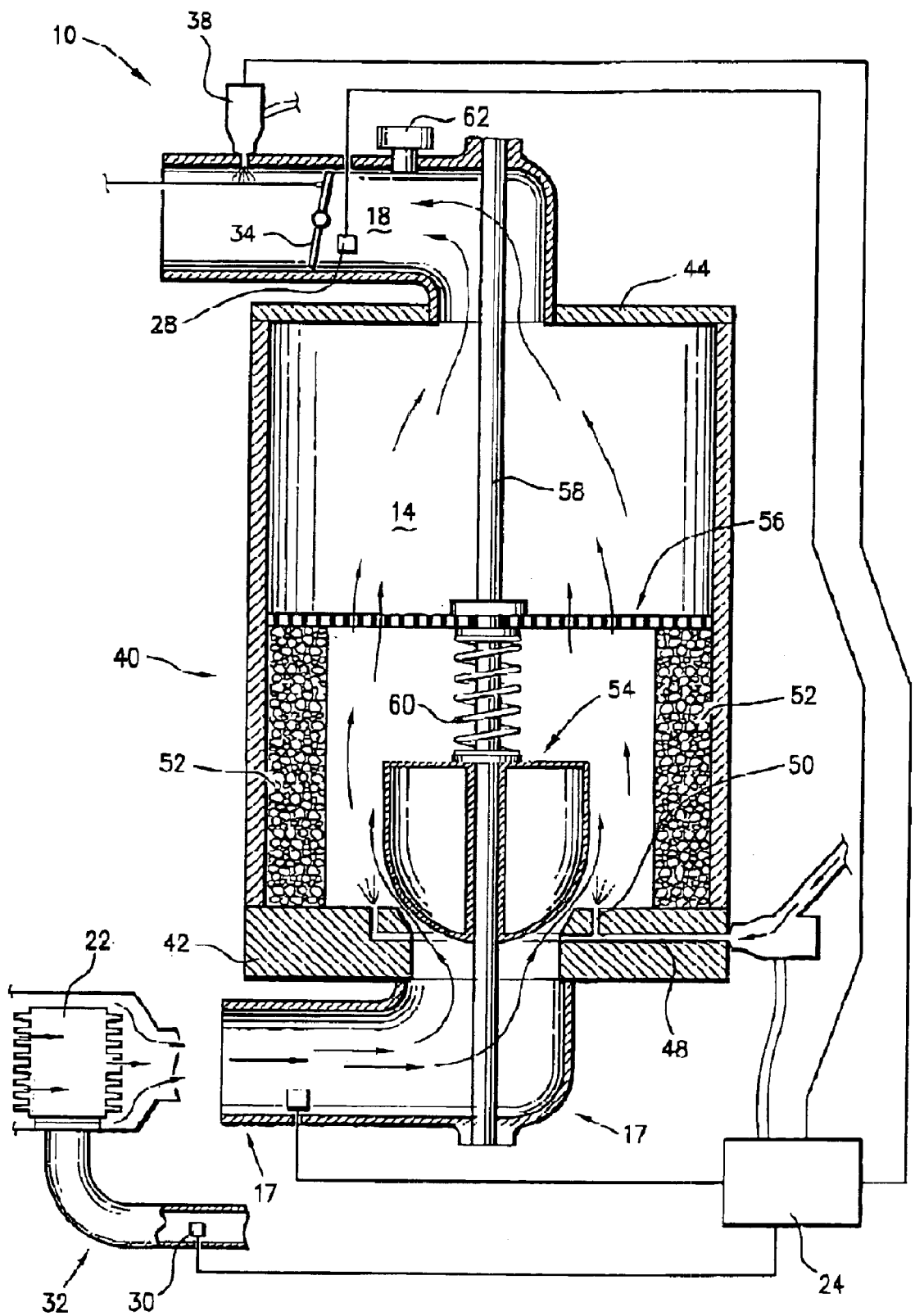

FIG. 2 illustrates a variation of the fuel supply system 10. The fuel system 10 differs from that depicted in FIG. 1 by the inclusion of a foam mantle 52, a ball valve 54 and a perforated screen 56 each of which is a similar structure and operation to that described in Applicant's earlier International Application No. PCT/AU95/00239, the contents of which are incorporated herein by way of reference.

Particularly, the foam mantle 52 is in the shape of an annulus and sits on the end 42 of the canister 40 extending to about one half the axial length of the cylinder 40. A portion of the fuel mist injected into the chamber 14 may be retained within the mantle 52. The ball valve 54 is slidably mounted on a post 58 extending axially through the cylinder 40. Ball valve 54 is arranged to control the volume of air admitted into the chamber 14 through the inlet opening 16 in accordance with air pressure within the chamber 14 which in turn is influenced by the vacuum applied by the engine via the fuel intake manifold and outlet 18. A spring 60 biases the valve 54 to a position where it minimizes the size of the inlet opening 16 and thus the amount of heated air entering the chamber 14. With the creation of a vacuum or at least a relative negative pressure within the chamber 14, the valve 54 is drawn upwardly along the post 58 against the bias of spring 60. The outward flaring of the inlet opening 16 provides a seat for the valve which also directs air toward the mantle 52. This assists in cracking fuel suspended within the mantle 42.

The screen 56 which extends radially above the mantle 52 provides a base against which the spring 60 operates and also acts to break up any large drops of fuel within the chamber 14. The mesh 56 may be coated with or made from a catalytic material which assists in the cracking of the fuel.

Now that embodiments of the present invention have been described in detail it will be apparent to those skilled in the relevant arts that numerous modifications and variations may be made without departing from the basic inventive concepts. For example, the heater 22 is depicted as being a heat sink in thermal communication with the exhaust manifold 32 of an engine incorporating the system 10. However, in an alternate embodiment, the heater 22 may be a separate electric heater disposed in or wound about the intake 16. Further, referring in particular to the embodiment shown in FIG. 1, the system 10 may be provided with an axially extending conduit in fluid communication with the fuel injector 20 to spray fuel mist at one or more locations along its length into the chamber 14. In addition, an auxiliary air inlet valve 62 may be provided in the conduit 19 to provide auxiliary air to the mixture flowing from the outlet 18. This may be beneficial for large capacity engines such as large V6 or V8 engines particularly at high engine speeds. The valve 62 can be operated on the basis of engine vacuum or alternately by the controller 24 to provide varying amounts of auxiliary air depending on engine speed or load.

All such modifications and variations together with others that would be obvious to a person of ordinary skill in the art are deemed to be within the scope of the present invention the nature of which is to be determined by the above description and the appended claims.

The claims defining the invention are as follows:

1. A fuel system for an internal combustion (IC) engine, said system comprising:
    a housing defining a thermal cracking chamber, and provided with an air inlet opening upstream of said chamber and an outlet opening downstream of said chamber;
    a fuel injector that injects a fuel mist into said chamber;
    an air heater that heats air flowing through said inlet opening into said chamber to a temperature in the range of 110°–260° C.;
    a controller coupled with said fuel injector to control the injection of said fuel mist into said chamber; and,
    an air temperature sensor for providing a first signal to said controller indicative of the temperature of air flowing into said chamber through said inlet opening, and wherein said controller is programmed to vary the volume of fuel in said fuel mist inversely with variations in said air temperature;
    whereby, in use, said fuel is thermally cracked in said chamber by collision with molecules of said heated air to form a thermally cracked fuel and heated air mixture, which is supplied to a fuel intake manifold of said IC engine via said outlet opening.

2. The system according to claim 1 further comprising an oxygen sensor disposed in an exhaust manifold of said IC engine and providing a second signal to said controller indicative of the oxygen content of exhaust gases produced by combustion of said cracked fuel in said IC engine, and wherein said controller is programmed to vary the volume of fuel in said fuel mist inversely with variations in said oxygen content.

3. The system according to claim 2 further comprising a valve provided in said outlet and adapted for coupling to an accelerator control of a vehicle in which said IC engine is mounted, said valve having a minimum open position providing maximum restriction to flow of said cracked fuel to said fuel intake manifold, and a maximum open position providing minimum restriction to flow of said cracked fuel to said fuel intake manifold, and a valve position sensor providing a third signal to said controller indicative of the degree of openness of said valve, and wherein said controller is programmed to vary the volume of fuel in said fuel mist in proportion to the degree of openness of said valve.

4. The system according to claim 3 further comprising a cold start fuel injector for spraying a fuel mist into a conduit coupled to said outlet on initial operation of said internal combustion engine.

5. The system according to claim 4 wherein said controller is operatively coupled to said cold start fuel injector for controlling the volume of fuel in the fuel mist spray by said cold start injector on the basis of said air temperature such that said controller disables said cold start fuel injector when said air temperature is above a threshold temperature.

6. The system according to claim 1 wherein said inlet opening is of a diameter less than a diameter of said chamber whereby pressure of said heated air is reduced upon flowing through said inlet opening into said chamber.

7. The system according to claim 6 wherein said outlet opening is of a diameter less than said inlet opening.

8. The system according to claim 7 wherein said chamber is of a diameter at least two and half times the diameter of said outlet opening.

9. The system according to claim 8 wherein said inlet opening and outlet opening are separated by a distance of at least 20 cm.

10. The system according to claim 9 wherein said inlet opening has a diameter of approximately 60 mm.

11. The system according to claim 10 wherein said outlet opening has a diameter of approximately 42 mm.

12. The system according to claim 6 wherein said fuel injector comprises one or more orifices arranged about said inlet opening.

13. The system according to claim 6 wherein said inlet opening is formed with a downstream portion of progressively increasing diameter.

14. A fuel system for an internal combustion engine comprising:
    a chamber having first and second opposite end walls and a side wall extending between said opposite end walls, with an inlet opening formed in said first wall and an outlet opening formed in said second wall;
    a fuel injector for injecting a fuel mist into said chamber;
    an air heater for heating air to a temperature of between 110° C. to 260° C.;
    a conduit for directing said heated air into said chamber through said air inlet;
    a controller coupled with said fuel injector to control the injection of said fuel mist into said chamber; and,
    an air temperature sensor for providing a first signal to said controller indicative of the temperature of air flowing into said chamber through said inlet opening, and wherein said controller is programmed to vary the volume of fuel in said fuel mist inversely with variations in said air temperature;
    said fuel mist mixing with said heated air in said chamber to cause thermal cracking of said fuel and form a thermally cracked fuel and heated air mixture, said mixture being drawn from said outlet for combustion in a combustion chamber of said internal combustion engine.

15. The system according to claim 14 further comprising an oxygen sensor disposed in an exhaust manifold of said IC engine and providing a second signal to said controller indicative of the oxygen content of exhaust gases produced by combustion of said cracked fuel in said IC engine, and wherein said controller is programmed to vary the volume of fuel in said fuel mist inversely with variations in said oxygen content.

16. The system according to claim 15 further comprising a valve provided in said outlet and adapted for coupling to an accelerator control of a vehicle in which said IC engine is mounted, said valve having a minimum open position providing maximum restriction to flow of said cracked fuel to said fuel intake manifold, and a maximum open position providing minimum restriction to flow of said cracked fuel to said fuel intake manifold, and a valve position sensor providing a third signal to said controller indicative of the degree of openness of said valve, and wherein said controller is programmed to vary the volume of fuel in said mist in proportion to the degree of openness of said valve.

17. The system according to claim 16 further comprising a cold start fuel injector for spraying a fuel mist into a conduit coupled to said outlet on initial operation of said internal combustion engine.

18. The system according to claim 17 further comprising said controller further operatively coupled to said cold start fuel injector for controlling the volume of fuel in the fuel mist spray by said cold start injector on the basis of said air temperature such that said controller disables said cold start fuel injector when said air temperature is above a threshold temperature.

19. The system according to claim 14 wherein said inlet opening is of a diameter less than a diameter of said chamber whereby pressure of said heated air is reduced upon flowing through said inlet opening into said chamber.

20. The system according to claim 19 wherein said outlet opening is of a diameter less than said inlet opening.

21. The system according to claim 20 wherein said chamber is of a diameter at least two and half times the diameter of said outlet opening.

22. The system according to claim 21 wherein said inlet opening and outlet opening are separated by a distance of at least 20 cm.

23. The system according to claim 22 wherein said inlet opening has a diameter of approximately 60 mm.

24. The system according to claim 23 wherein said outlet opening has a diameter of approximately 42 mm.

25. The system according to claim 24 wherein said fuel injector includes one or more orifices arranged about said inlet opening.

26. The system according to claim 25 wherein said inlet opening is formed with a downstream portion of progressively increasing diameter.

27. The system according to claim 14 wherein said fuel injector sprays fuel into said chamber from said first wall.

28. A method of conditioning liquid fuel prior to combustion in an internal combustion engine, said method comprising:
   providing a chamber with an inlet opening at one end and an outlet opening at an opposite end;
   injecting a mist of liquid fuel into said chamber;
   introducing heated fresh air at a temperature of between 110° C. to 260° C. into said chamber via said inlet opening;
   mixing said fuel with said heated air to thermally crack said liquid fuel and form a thermally cracked fuel and heated air mixture;
   and drawing said mixture from said outlet for combustion in said internal combustion engine.

29. A fuel system for an internal combustion (IC) engine, said system comprising:
   a housing defining a thermal cracking chamber, and provided with an air inlet opening upstream of said chamber and an outlet opening downstream of said chamber;
   a fuel injector for injecting a fuel mist into said chamber; and,
   an air heater that heats fresh air prior to flowing through said inlet opening into said chamber to a temperature in the range of 110°–260° C.;
   said fuel being thermally cracked in said chamber by collision with molecules of said heated air to form a thermally cracked fuel and heated air mixture, which is supplied to a fuel intake manifold of said IC engine via said outlet opening.

30. The system according to claim 29 further comprising a controller coupled with said fuel injector to control the injection of said fuel mist into said chamber.

31. The system according to claim 30 further comprising an air temperature sensor for providing a first signal to said controller indicative of the temperature of air flowing into said chamber through said inlet opening, and wherein said controller is programmed to vary the volume of fuel in said fuel mist inversely with variations in said air temperature.

32. The system according to claim 31 further comprising an oxygen sensor disposed in an exhaust manifold of said IC engine and providing a second signal to said controller indicative of the oxygen content of exhaust gases produced by combustion of said cracked fuel in said IC engine, and wherein said controller is programmed to vary the volume of fuel in said fuel mist inversely with variations in said oxygen content.

33. The system according to claim 32 further comprising a valve provided in said outlet and adapted for coupling to an accelerator control of a vehicle in which said IC engine is mounted, said valve having a minimum open position providing maximum restriction to flow of said cracked fuel to said fuel intake manifold, and a maximum open position providing minimum restriction to flow of said cracked fuel to said fuel intake manifold, and a valve position sensor providing a third signal to said controller indicative of the degree of openness of said valve, and wherein said controller is programmed to vary the volume of fuel in said mist in proportion to the degree of openness of said valve.

34. The system according to claim 33 further comprising a cold start fuel injector for spraying a fuel mist into a conduit coupled to said outlet on initial operation of said internal combustion engine.

35. The system according to claim 34 wherein said controller is operatively coupled to said cold start fuel injector for controlling the volume of fuel in the fuel mist spray by said cold star injector on the basis of said air temperature such that said controller disables said cold start fuel injector when said air temperature is above a threshold temperature.

36. The system according to claim 29 wherein said inlet opening is of a diameter less than a diameter of said chamber whereby pressure of said heated air is reduced upon flowing through said inlet opening into said chamber.

37. The system according to claim 36 wherein said outlet opening is of a diameter less than said inlet opening.

38. A fuel system for an internal combustion engine comprising:
   a chamber having first and second opposite end walls and a side wall extending between said opposite end walls, with an inlet opening formed in said first wall and an outlet opening formed in said second wall;
   a fuel injector for injecting a fuel mist into said chamber;
   an air heater for heating fresh air prior to said fresh air flowing into said chamber through said inlet opening;
   a conduit for directing said heated air into said chamber through said air inlet;
   said inlet opening, chamber and outlet opening relatively dimensioned to cause a reduction in pressure of said heated air when it flows into said chamber;

said fuel mist mixing with said heated air in said chamber to cause thermal cracking of said fuel and form a thermally cracked fuel and heated air mixture, said mixture being drawn from said outlet for combustion in a combustion chamber of said internal combustion engine.

39. The system according to claim 38 further comprising a controller coupled with said fuel injector to control the injection of said fuel mist into said chamber.

40. The system according to claim 39 further comprising an air temperature sensor for providing a first signal to said controller indicative of the temperature of air flowing into said chamber through said inlet opening, and wherein said controller is programmed to vary the volume of fuel in said fuel mist inversely with variations in said air temperature.

41. The system according to claim 40 further comprising an oxygen sensor disposed in an exhaust manifold of said IC engine and providing a second signal to said controller indicative of the oxygen content of exhaust gases produced by combustion of said cracked fuel in said IC engine, and wherein said controller is programmed to vary the volume of fuel in said fuel mist inversely with variations in said oxygen content.

42. The system according to claim 41 further comprising a valve provided in said outlet and adapted for coupling to an accelerator control of a vehicle in which said IC engine is mounted, said valve having a minimum open position providing maximum restriction to flow of said cracked fuel to said fuel intake manifold, and a maximum open position providing minimum restriction to flow of said cracked fuel to said fuel intake manifold, and a valve position sensor providing a third signal to said controller indicative of the degree of openness of said valve, and wherein said controller is programmed to vary the volume of fuel in said mist in proportion to the degree of openness of said valve.

43. The system according to claim 42 further comprising a cold start fuel injector for spraying a fuel mist into a conduit coupled to said outlet on initial operation of said internal combustion engine.

44. The system according to claim 43 wherein said controller further operatively coupled to said cold start fuel injector for controlling the volume of fuel in the fuel mist spray by said cold start injector on the basis of said air temperature such that said controller disables said cold start fuel injector when said air temperature is above a threshold temperature.

45. The system according to claim 38 wherein said inlet opening is of a diameter less than a diameter of said chamber whereby pressure of said heated air is reduced upon flowing through said inlet opening into said chamber.

46. The system according to claim 45 wherein said outlet opening is of a diameter less than said inlet opening.

47. A method of conditioning liquid fuel prior to combustion in an internal combustion engine, said method comprising:

providing a chamber with an inlet opening at one end and an outlet opening at an opposite end;

injecting a mist of liquid fuel into said chamber;

introducing fresh heated air into said chamber via said inlet opening;

reducing pressure of said heated air upon entry into said chamber;

mixing said fuel with said heated air to thermally crack said liquid fuel and form a thermally cracked fuel and heated air mixture; and, drawing said mixture from said outlet for combustion in said internal combustion engine.

48. The method according to claim 47 wherein said fresh air is heated to a temperature of between 110° C. to 260° C.

* * * * *